Patented June 24, 1952

2,601,632

UNITED STATES PATENT OFFICE 2,601,632

PRODUCING AN IMPROVED SYNTHETIC RUBBER FROM A MULTICOMPONENT MONOMERIC MATERIAL

William B. Reynolds, Bartlesville, Okla., and Charles F. Fryling, Phillips, Tex., assignors to Phillips Petroleum Company, a corporation of Delaware No Drawing. Application November 25, 1949, Serial No. 129,516

4 Claims. (Cl. 260—80.7)

This invention relates to the production of an improved synthetic rubber. In one embodiment, the invention relates to the production of a synthetic rubber having a high resistance to failure in use due to physical causes.

Increasing interest has been shown in elastomers which are adaptable for low temperature applications, such as for use under arctic conditions. Synthetic rubber such as GR–S is not entirely satisfactory for such uses since it becomes brittle at low temperatures and natural rubber also has drawbacks since it undergoes crystallization when exposed to low temperatures for prolonged periods.

We have now discovered that polymers of certain specific multicomponent monomeric materials have improved properties and excellent processing characteristics. These polymers are produced by the polymerization of monomeric materials which are mixtures of four, or more, polymerizable organic compounds, particularly mixtures of dienes. In some instances the monomeric material can also contain vinyl aromatic compounds, such as styrene and various substituted styrenes, and the like. These polymers from multicomponent monomeric materials are particularly suitable for low temperature applications since they not only have low freezing points but are amorphous in nature and therefore do not have any tendency to undergo crystallization. In addition to their properties which make them particularly adaptable for low temperature work, these polymers show excellent tensile strength, elongation, hysteresis, and flex life properties.

The object of this invention is to produce a synthetic rubber having good physical properties.

Another object of this invention is to produce a synthetic rubber which is suitable for use at extremely low temperatures.

A further object of this invention is to produce a synthetic rubber having a good flex life and a low hysteresis.

Further objects and advantages of this invention will become apparent, to those skilled in the art, from the accompanying disclosure and discussion.

The process of this invention, and the synthetic rubber polymer produced thereby, is based upon our discovery that by polymerizing a monomeric material comprising at least four different conjugated diolefin hydrocarbons in approximately equal proportions, the resulting polymer has unique properties. To obtain best results the polymerization should be conducted at as low a polymerization temperature as possible, preferably below 0° C. Our experience in polymerizing a wide variety of monomeric materials, from those composed of a single ingredient and the conventional butadiene-styrene mixture through complex monomeric materials such as discussed herein in detail, indicates that the temperature of polymerization is more important, as to the physical properties of the polymer, than the specific recipe employed. The type of catalyst-activator system, and the temperature, primarily influence the polymerization rate, whatever the composition of the monomeric material used, while physical properties of the polymer are influenced by composition of the monomeric material and by polymerization temperature. For ordinary uses of synthetic rubber, more favorable physical properties result from low polymerization temperatures. In connection with the present invention, the improved product can result from so-called bulk, or homogenous polymerization, using such a polymerization catalyst as finely divided sodium or potassium, and can also result from polymerization of the monomeric material while dispersed in an immiscible liquid, usually an aqueous medium, using any one of a number of polymerization recipes. Since faster polymerization rates are usually obtained, at low temperatures, with the latter type of process, this is the one which will be primarily considered in connection with the present invention. One type of recipe which is usually preferred is as follows:

| | Parts by weight |
|---|---|
| Monomeric material | 100 |
| Aqueous phase | 50 to 275 |
| Emulsifying agent | 1 to 5 |
| Modifying agent | 0.05 to 2 |
| Catalyst composition | 0.1 to 5 |

The catalyst composition, or catalyst-activator system, can be any one which will give a satisfactory polymerization rate at the temperature chosen. Preferred catalyst compositions include: a combination of an organic hydroperoxide and a reactant, such as (1) a combination of a reducing sugar (or the like) and a salt of iron or similar heavy metal, (2) a ferrous pyrophosphate complex, alone or with such a reducing compound, (3) a polyamino compound (such as tetraethylenepentamine, and the like), etc.; or a diazothioether, either alone as discussed in Reynolds and Cotten application Serial No. 641,866, filed January 17, 1946, now Patent 2,501,692, issued March 28, 1950, or in combination with a ferricyanide and a mercaptan, as discussed by Kolthoff and Dale in Journal of Polymer Science, vol. 3, 400–409 (1948).

When using such a recipe, it is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent or more, of the alcohol present be in the aqueous phase. A high-boiling alcohol such as glycerine is difficult to recover from the resulting serum; a low-boiling alcohol such as methanol is easily removed and frequently preferred. Other aliphatic alcohols which are higher-boiling than methanol, such as propanol, however, are frequently less satisfactory. If the resulting latex tends to gel at low reaction temperatures, a larger proportion of aqueous phase should be used. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 98 per cent of the monomeric material is polymerized.

The monomeric material employed in connection with the present invention is a mixture of approximately equal proportions by weight of at least four conjugated diolefin hydrocarbons selected from the group consisting of 1,3-butadiene, isoprene (2-methyl-1,3-butadiene), piperylene (1,3-pentadiene), methylpentadiene (a term considered to be generic to the various methyl-1,3-pentadienes, and mixtures thereof), and dimethylbutadiene (2,3-dimethyl-1,3-butadiene). The reactive components of the monomeric material should comprise at least 90 per cent of such a mixture.

The tendency to crystallize or to become brittle when subjected to low temperatures makes many elastomers unsatisfactory for certain applications. The polymers of this invention, produced from at least four polymerizable materials, are amorphous in character and are therefore superior to natural rubber and synthetic elastomers such as conventional butadiene-styrene copolymers, for low temperature uses. While this invention is not dependent upon any explanation of the structure of the polymers or the fact that they do not undergo crystallization, it is generally assumed that, in the polymerization of butadiene with other comonomers, the comonomer molecules attach themselves randomly to the growing polymer chain. This irregular arrangement in the structure of the polymer molecule would tend to destroy crystallinity. Hence, the regions adjacent to the comonomer residues appear to be regions in which crystallinity would be inhibited. Other things being equal, the more comonomer residues per butadiene residue in the copolymer chain, the less the tendency for the copolymer to crystallize regardless of the nature of the comonomer molecules. The low freezing points of the multicomponent polymers is probably explained by the presence of the several polymerizable materials which serve as freezing point depressants on each other.

Advantages of this invention are illustrated by the following examples. The reactants, and their proportions, and the other specific ingredients of the recipes are presented as being typical and should not be construed to limit the invention unduly.

*Example I*

A copolymer was prepared at −10° C. according to the following recipe, charging a monomeric material consisting of equal parts by weight of 1,3-butadiene, trans-1,3-pentadiene, isoprene, and 2-methyl-1,3-pentadiene.

| | Parts by weight |
|---|---|
| Monomeric material | 100 |
| Water | 126 |
| Glycerin | 66 |
| Potassium laurate (95% neutralized) | 5.0 |
| Cumene hydroperoxide | 0.495 |
| Mercaptan Blend [1] | 0.05 |
| Activator composition, 28 volumes containing: | |
| $FeSO_4 \cdot 7H_2O$ | 0.62 |
| $Na_4P_2O_7 \cdot 10H_2O$ | 1.40 |

[1] A blend of tertiary $C_{12}$, $C_{14}$, and $C_{16}$ aliphatic mercaptans in a ratio of 3:1:1 parts by weight.

The preparation of the activator was effected by heating a mixture of 2.2 parts by weight $FeSO_4 \cdot 7H_2O$ and 5.0 parts $Na_4P_2O_7 \cdot 10H_2O$ in sufficient water to make 100 volumes at 60° C. for 40 minutes. Polymerization was carried out in the usual manner. A conversion of 56 per cent was attained in 48 hours.

The polymer was compounded according to the following recipe:

| | Parts by weight |
|---|---|
| Elastomer | 100 |
| Furnace black | 50 |
| Zinc oxide | 3 |
| Asphalt softener | 6 |
| Sulfur | 1.75 |
| N-cyclohexyl-2-benzothiazolesulfenamide | 0.8 |
| Stearic acid [1] | 2 |

[1] Omitted for control.

Curing was effected at 307° F. for 30 minutes and physical properties determined. A control sample was made by polymerizing a monomeric material consisting of 72 parts butadiene and 28 parts styrene at 50° C., using a standard potassium persulfate recipe and compounding the resulting synthetic rubber polymer in the foregoing recipe. The following results were obtained.

|  | Four Component Polymer | Control |
|---|---|---|
| Raw Mooney, ML4 | 69 | 53 |
| Compounded Mooney, MS 1½ | 37 | 32 |
| Stress-strain properties at 80° F.: |  |  |
| 300% Modulus | 1,330 | 1,890 |
| Tensile | 2,800 | 2,950 |
| Elongation, Per cent | 510 | 410 |
| Stress-strain properties at 200° F. (45 minute cure): |  |  |
| Tensile | 1,160 | 1,200 |
| Elongation, Per cent | 300 | 240 |
| Unaged: |  |  |
| Hysteresis, ΔT, °F | 57.0 | 71.2 |
| Resilience, Per cent | 67.5 | 61.6 |
| Flex life at 210° F., thousands of flexures to failure | 15.8 | 8.1 |
| Brittle point | −63 | −63 |
| Oven-aged 24 hours at 212° F.: |  |  |
| Hysteresis, ΔT, °F | 53.2 | 61.7 |
| Resilience, Per cent | 70.2 | 68.8 |
| Flex life at 210° F., thousands of flexures to failure | 6.3 | 4.5 |

The extremely low hysteresis coupled with high flex life, and also the very low compounded Mooney value show the superiority of the four-component polymer over the control. This polymer had better dynamic properties than the control at −48° C. and did not exhibit the undesirable properties of natural rubber.

Example II

A number of polymers were produced from several monomeric materials, at a polymerization temperature of −10° C., and resulting polymers and a sample of smoked sheet (natural rubber) were compounded. The polymerization recipe used in preparing the polymers was as follows:

|  | Parts by weight |
|---|---|
| Monomeric material | 100 |
| Water | 154 |
| Glycerin | 66 |
| Potassium laurate (95% neutralized) | 5 |
| $C_{12}$—$C_{14}$—$C_{16}$ alkyl mercaptan blend | 0.05 |
| $FeSO_4 \cdot 7H_2O$ | 0.62 |
| $Na_4P_2O_7 \cdot 10H_2O$ | 1.4 |
| Diisopropylbenzene hydroperoxide | 0.442 |

The polymers, and natural rubber, were compounded using the following recipes, in parts by weight.

| Rubber Sample | A and B | C | D | E | Natural Rubber |
|---|---|---|---|---|---|
| Furnace black | 50 | 50 | 50 | 50 | 50 |
| Zinc Oxide | 3 | 3 | 3 | 3 | 4 |
| Asphalt Softener | 6 | 6 | 6 | 6 | 10 |
| Stearic Acid | 2 | 0 | 0 | 2 | 3 |
| Sulfur | 1.75 | 1.75 | 1.75 | 1.75 | 2.5 |
| Accelerator | 0.7 | 0.85 | 0.7 | 0.8 | 0.4 |
| Additional Antioxidant | 0 | 0 | 0 | 0 | 1.5 |

When these materials were so compounded, and cured and tested in the standard manner, the results shown in the accompanying table were obtained. The table also presents the compositions of the various monomeric materials.

| | Rubber Tested | | | | | |
|---|---|---|---|---|---|---|
| | Polymer | | | | | Natural |
| Sample No. | A | B | C | D | E | |
| Monomeric Material: | | | | | | |
| Butadiene | 25 | 25 | 70 | 100 | 70 | |
| Piperylene | 25 | 25 | 0 | 0 | 30 | |
| Isoprene | 25 | 25 | 0 | 0 | 0 | |
| Methyl pentadiene | 25 | 25 | 0 | 0 | 0 | |
| Styrene | 0 | 0 | 30 | 0 | 0 | |
| Conversion: | | | | | | |
| Hours | 10.8 | 48 | ------ | ------ | 16 | ------ |
| Per Cent | 60.2 | 56 | ------ | ------ | 62 | ------ |
| Properties of Rubber: | | | | | | |
| Raw Mooney, ML4 | 47 | 69 | 47 | ------ | 82 | 75 |
| Compounded Sample Unaged: | | | | | | |
| Mooney MS 1½ | 40 | 37 | 50 | 54 | 68.5 | 35.3 |
| Stress-Strain at 80° F.: | | | | | | |
| 300% Modulus | 1,370 | 1,330 | 1,560 | 1,790 | ------ | 1,390 |
| Tensile | 2,960 | 2,800 | 3,590 | 2,380 | 1,700 | 3,340 |
| Elongation, per cent | 520 | 510 | 570 | 370 | 300 | 535 |
| Hysteresis ΔT, °F | 60.2 | 57.0 | 69.3 | 66.9 | 75.3 | 50.5 |
| Flex life at 210° F. (thousands of flexures to failure) | 10.7 | 15.8 | 40.8 | 2.2 | 0.5 | 200 |
| Oven Aged 24 hours at 212° F.: | | | | | | |
| Hysteresis, ΔT, °F | 57.5 | 53.2 | 61.2 | 55.1 | 68.2 | 50.5 |
| Flex life at 210° F. (thousands of flexures to failure) | 7.8 | 6.3 | 4.6 | 0.1 | 0.1 | 12.5 |

It is to be noted that samples A and B have superior flex life, especially after aging, and low hysteresis, both of which are desired properties.

Example III

A synthetic rubber was prepared from a monomeric material comprising a mixture of butadiene, isoprene, piperylene, methyl pentadiene, 2,3-dimethyl butadiene and styrene with the components being present in a 19/19/19/19/19/5 weight ratio, except that 0.25 part mercaptan blend was used instead of 0.05 part. A conversion of 48.1 per cent was obtained in 23.5 hours. The polymer was compounded as in the preceding examples and cured at 307° F. as before. A sample of this polymer was subjected to low temperatures together with samples of GR-S and natural rubber. The GR-S sample froze at −55° C. and the natural rubber at −65° C., while the multicomponent polymer remained amorphous under the same conditions.

As will be evident to those skilled in the art, various modifications of this invention can be made, or followed, in the light of the foregoing disclosure and discussion, without departing from the spirit or scope of the disclosure or from the scope of the claims.

We claim:

1. A process for producing an improved synthetic rubber, which comprises polymerizing an aqueous dispersion of a hydrocarbon monomeric material comprising at least 90 per cent by weight of equal parts by weight of at least four members selected from the group consisting of butadiene, isoprene, piperylene, methylpentadiene, and dimethylbutadiene, at a polymerization temperature below 0° C., and recovering a polymeric material so produced.

2. An improved synthetic rubber comprising a hydrocarbon copolymer of at least 90 per cent by weight of equal parts by weight of at least four members selected from the group consisting of 1,3-butadiene, isoprene, piperylene, methylpentadiene, and dimethylbutadiene, and which when compounded and vulcanized with carbon black and sulfur has a lower hysteresis, a greater flex life after aging, and a lower MS 1½ Mooney viscosity than a synthetic rubber copolymer prepared under the same conditions from 70 parts butadiene and 30 parts styrene, by weight, which has been similarly compounded and vulcanized.

3. A process for producing an improved synthetic rubber, which comprises polymerizing an aqueous dispersion of a hydrocarbon monomeric material consisting of equal parts by weight of butadiene, isoprene, piperylene, and methylpentadiene at a polymerization temperature below 0° C., and recovering a polymeric material so produced.

4. An improved synthetic rubber comprising a hydrocarbon copolymer of equal parts by weight of butadiene, isoprene, piperylene, and methylpentadiene, and which when compounded and vulcanized with carbon black and sulfur has a lower hysteresis, a greater flex life after aging, and a lower MS 1½ Mooney viscosity than a synthetic rubber copolymer prepared under the same conditions from 70 parts butadiene and 30 parts styrene, by weight, which has been similarly compounded and vulcanized.

WILLIAM B. REYNOLDS.
CHARLES F. FRYLING.

REFERENCES CITED

The following references are of record in the file of this patent:

UNITED STATES PATENTS

| Number | Name | Date |
| --- | --- | --- |
| 2,384,544 | Fryling | Sept. 11, 1945 |
| 2,384,574 | Stewart et al. | Sept. 11, 1945 |

OTHER REFERENCES

Shearon, Jr., et al.: Ind. and Eng. Chem., vol. 40, May 1948, pages 769–777.